Jan. 10, 1950
W. C. GEORGE ET AL
2,494,437
PROCESS OF MANUFACTURING COLLAPSIBLE
CELLULAR CONTAINER PARTITIONS
Original Filed Feb. 4, 1948
4 Sheets-Sheet 1
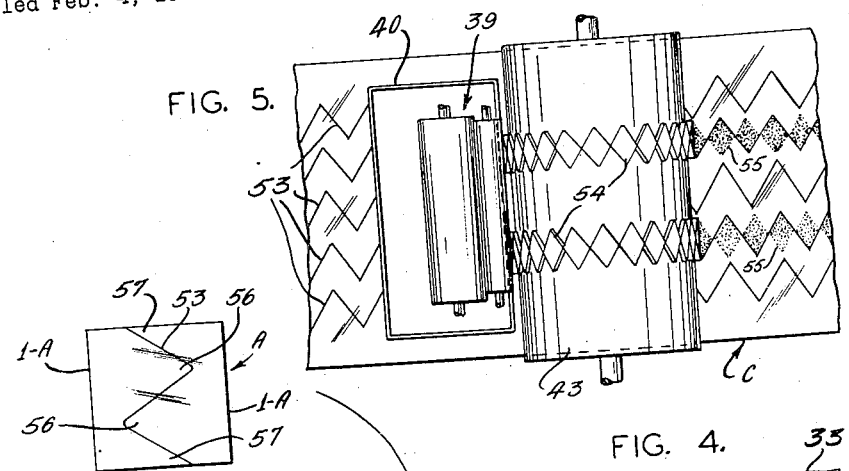
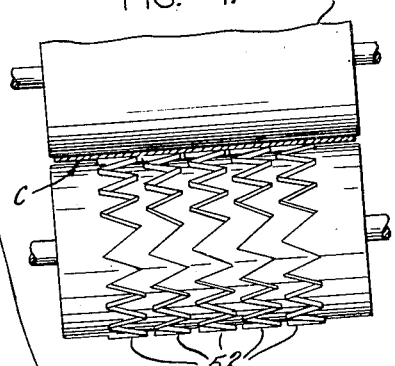
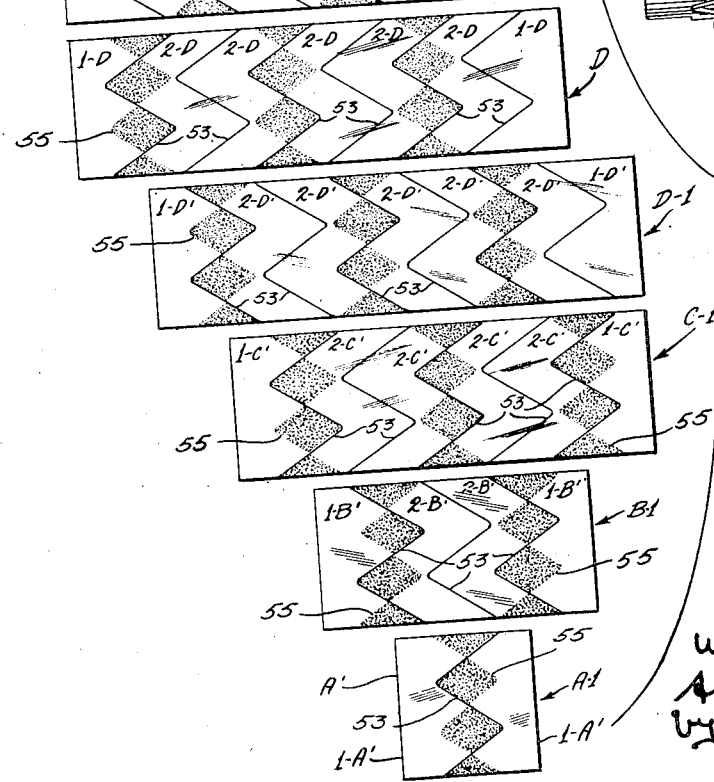
INVENTORS:
Walter C. George and
Arthur P. Klasing
by Carr, Karr & Crawley
Their ATTORNEYS.

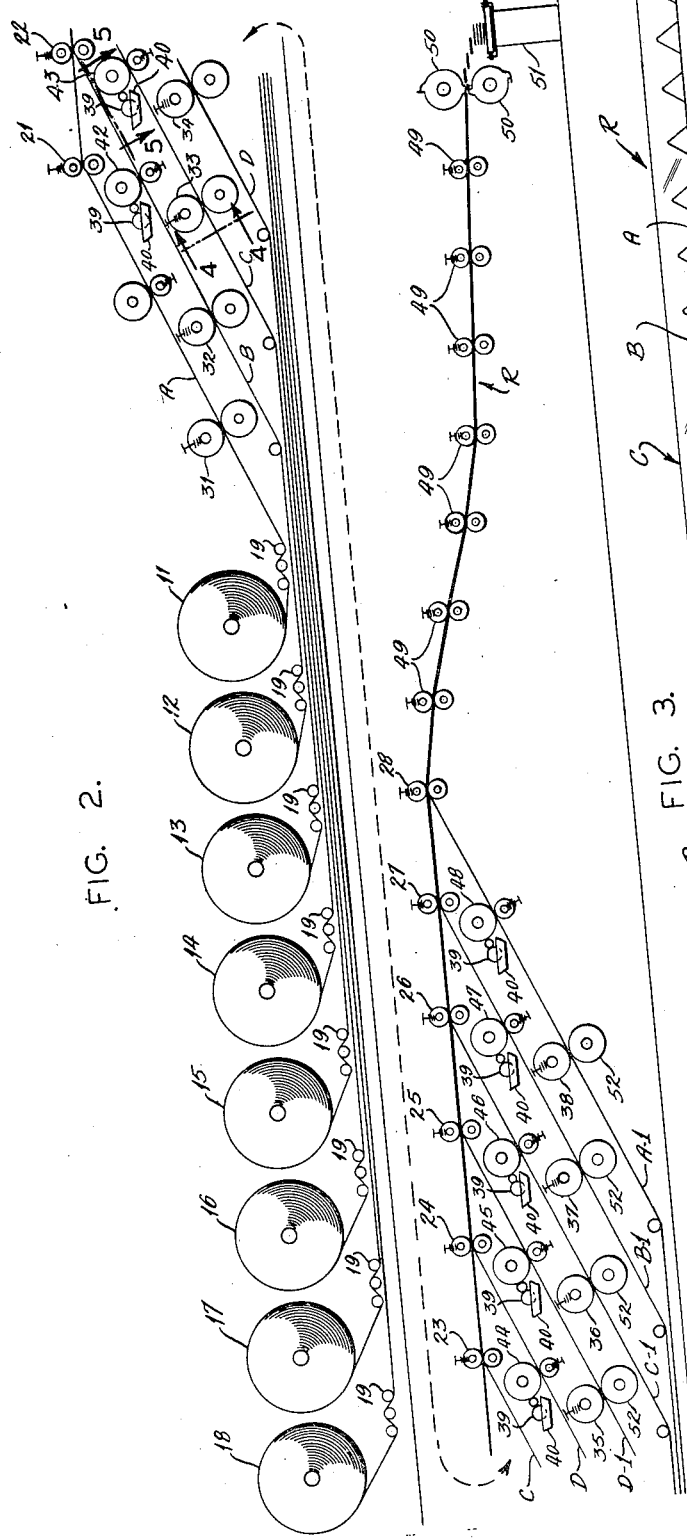

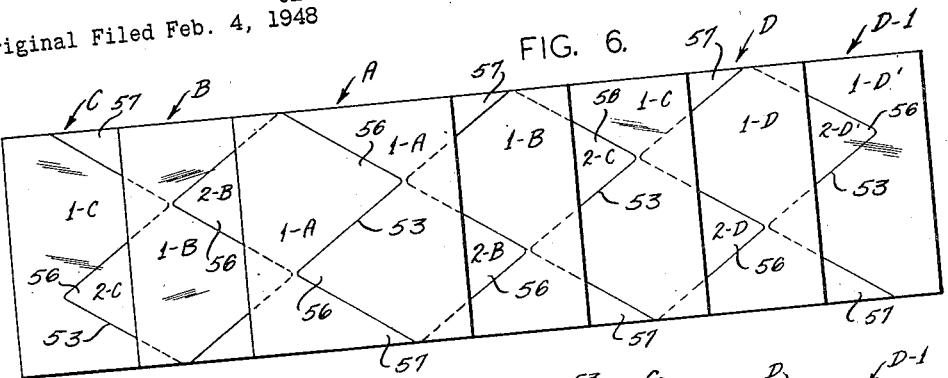
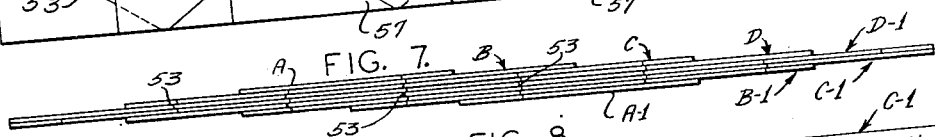
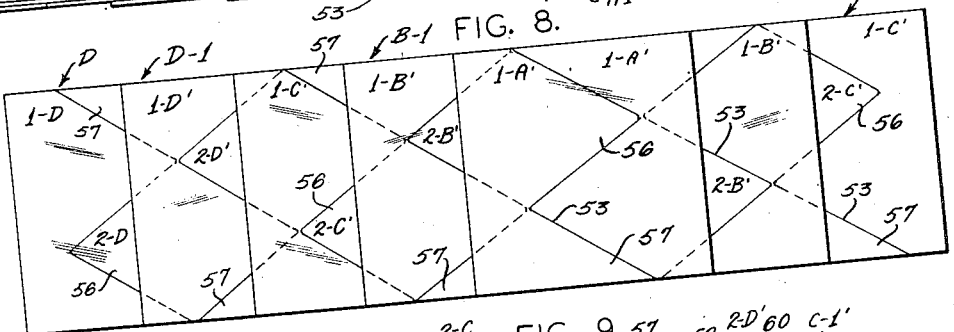
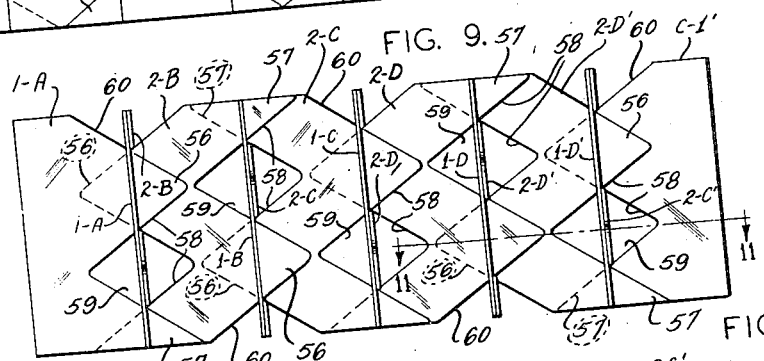
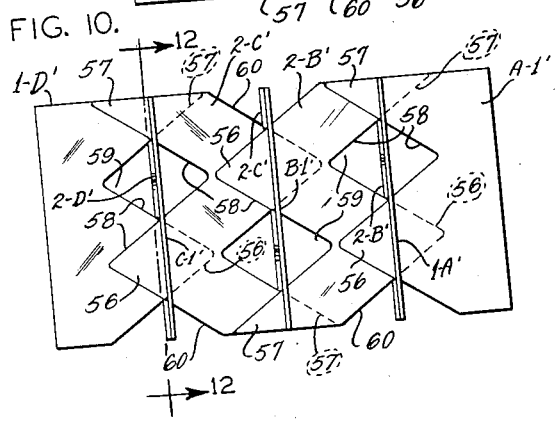
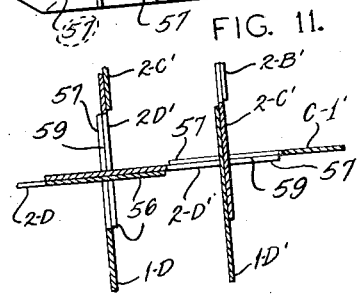

Jan. 10, 1950

W. C. GEORGE ET AL 2,494,437

PROCESS OF MANUFACTURING COLLAPSIBLE
CELLULAR CONTAINER PARTITIONS

Original Filed Feb. 4, 1948

4 Sheets-Sheet 4

INVENTORS:
Walter C. George and
Arthur P. Klasing
by Carr Carr & Gravely
Their ATTORNEYS.

Patented Jan. 10, 1950

2,494,437

UNITED STATES PATENT OFFICE 2,494,437

PROCESS OF MANUFACTURING COLLAPSIBLE CELLULAR CONTAINER PARTITIONS

Walter C. George, St. Louis, and Arthur P. Klasing, Webster Groves, Mo., assignors to Gaylord Container Corporation, St. Louis, Mo., a corporation of Maryland Original application February 4, 1948, Serial No. 6,266. Divided and this application July 30, 1948, Serial No. 41,637

6 Claims. (Cl. 93—37)

This application is a division of our copending application Serial No. 6,266, filed February 4, 1948.

This invention relates to the manufacture of collapsible strip type cellular container partitions. The principal object of the present invention is to devise a continuous simple and economical process for quickly and easily producing a strong and durable partition of the above type which may be made and shipped in collapsed flat compact form and readily set up for use. Other objects are to provide for permanently securing the partition parts together without the use of stitching or mechanical fasteners, to eliminate scoring and bending of the partition parts, to provide for horizontal ventilation through the cells of the partition and to prevent movement of the partition parts beyond their cell-forming positions when the partition is opened or set up. The invention consists in the process hereinafter described and claimed.

Figure 13:
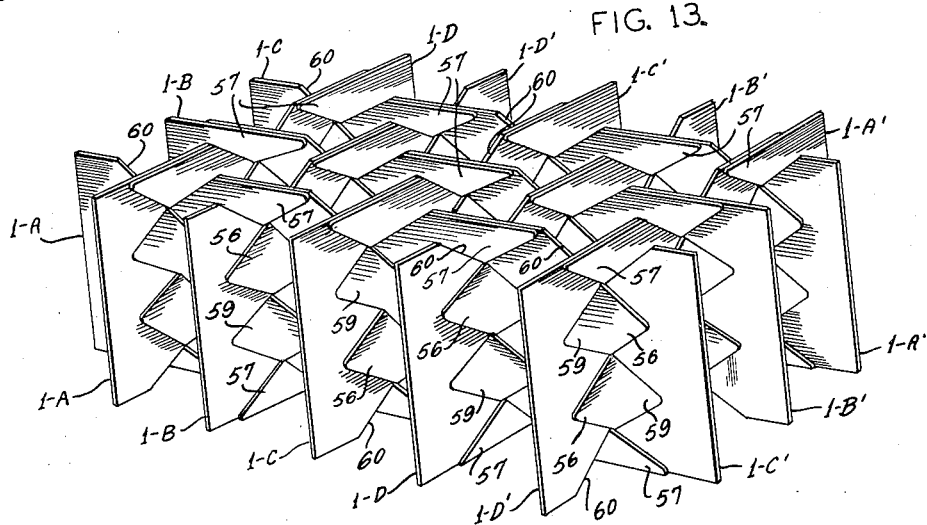
Figure 14:
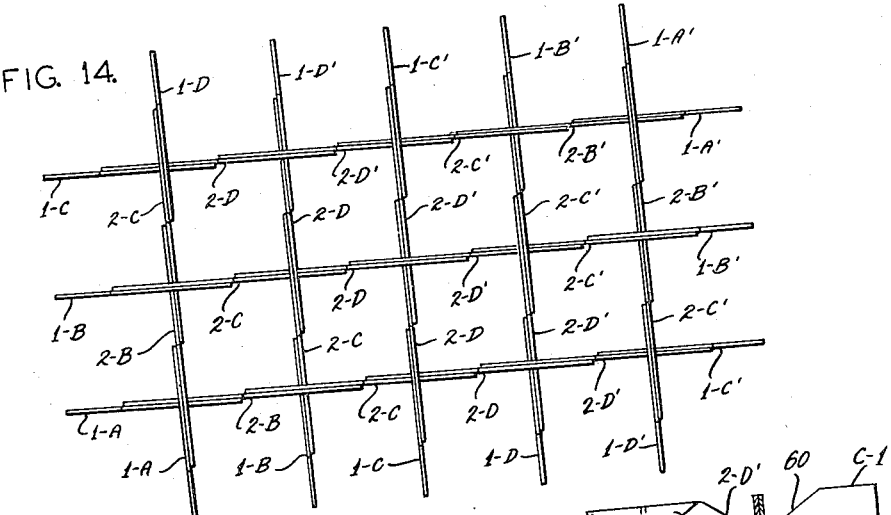
Figure 15:
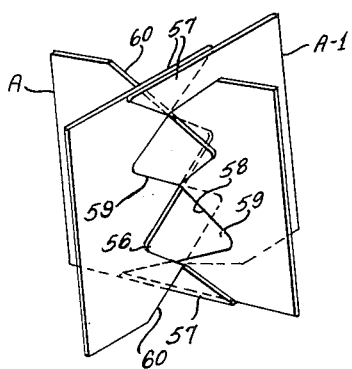
Figure 12:
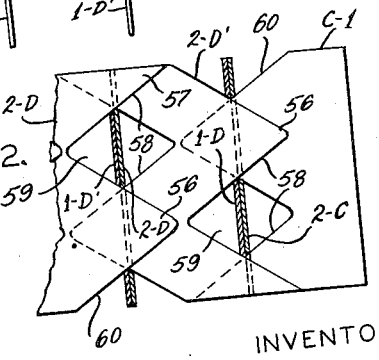

In the accompanying drawings, which form part of this specification and wherein like symbols refer to like parts wherever they occur, Fig. 1 is a plan view of the eight web sections from which a twenty-four cell partition embodying our invention is made, the web sections being shown in the laterally offset positions and in the top-to-bottom order which they occupy in the finished partition, Fig. 2 is a diagrammatic side elevational view of the apparatus used in carrying out the continuous process of manufacturing the partition, Fig. 3 is a fragmentary plan view, showing the eight slitted and superimposed webs from which the partitions are formed, Fig. 4 is a fragmentary elevational view of the pair of horizontal rolls for longitudinally slitting one of the advancing webs, the web being shown in vertical cross-section, Fig. 5 is a fragmentary plan view of one of the webs and the roll for applying the spotted longitudinal lines of glue thereto, Fig. 6 is a plan view looking at one side face of the collapsed partition, Fig. 7 is an edge view of the partition, Fig. 8 is a plan view looking at the opposite side of the partition, Fig. 9 is a side elevational view of the set-up or erected partition, Fig. 10 is an end elevational view thereof, Fig. 11 is a fragmentary horizontal section on the line 11—11 in Fig. 9, Fig. 12 is a fragmentary vertical section on the line 12—12 in Fig. 10, Fig. 13 is a perspective view of the set-up partition, Fig. 14 is a plan view thereof; and Fig. 15 is a perspective view of a set-up four cell partition.

The collapsible twenty-four cell container partition shown in the drawings is preferably made from eight webs of fiberboard, corrugated board or other suitable material; namely, two counterpart webs A and A—1, two counterpart webs B and B—1, two counterpart webs C and C—1 and two counterpart webs D and D—1 that are drawn from rotatably supported spaced parallel horizontal supply rolls 11, 12, 13, 14, 15, 16, 17 and 18, respectively. After leaving their supply rolls, the webs pass through suitable tensioning rolls 19 and thence through an apparatus which slits said webs lengthwise into strips, spots said strips with a suitable adhesive and superimposes them one on another to form a laminated ribbon which is then cut transversely to form complete flat partitions.

The webs increase in width from the web A to the web D and from the web A—1 to the web D—1. The web A is located at the top and the web A—1 is located at the bottom. The web B is located next to the web A and the web B—1 is located next to the web A—1. The web C is located next to the web B and the web C—1 is located next to the web B—1. The webs D and D—1 are located next to one another between the webs C and C—1. The webs A and A—1 are offset laterally relative to one another for a distance corresponding to their width. The webs B and B—1 extend equal distances on opposite sides of the webs A and A—1, respectively; and the webs C and C—1 extend a corresponding distance on opposite sides of the webs B and B—1, respectively. The webs D and D—1 are of the same width but are offset laterally so that each of said webs extends beyond the other on one side and terminates short of the other on the other side and the webs D and D—1 are flush with the webs C and C—1, respectively, on one side and extend beyond them on the opposite side.

The apparatus for longitudinally slitting and combining the eight superimposed webs in the laterally offset relation above described comprises eight horizontally spaced pairs of horizontal combining or pressure rolls 21, 22, 23, 24, 25, 26, 27 and 28, between which the webs are drawn from their supply rolls, eight pairs of horizontally disposed rolls 31, 32, 33, 34, 35, 36, 37 and 38 for longitudinally slitting the respective webs into separate strips prior to their passage through the combining rolls, and seven horizontal rolls 42, 43, 44, 45, 46, 47 and 48 for applying spotted longitudinal lines of glue or other suitable adhesive to the upper surfaces of all of the webs, except the top web A, after they leave their cutting or slitting rolls and before they reach the combining rolls. Each of the glue spotting rolls is supplied with glue through transfer rolls 39 one of which dips into a glue fountain or reservoir 40 and the other of which applies the glue to the spotting roll. Each of the glue spotting devices includes a pressure roll for holding the web in contact with the spotting roll.

The top web A is drawn from its supply roll 11 through its cutting rolls 31 and thence through the pairs of combining rolls 21 to 28, inclusive. The web B is drawn from its supply roll 12 through its pair of cutting rolls 32 and glue spotting roll 42 and thence through the combining rolls 22 to 28, inclusive, and spot-glued to the underside of the web A. The web C is drawn from its supply roll 13 through the cutting rolls 33 and the glue spotting roll 43 and thence through the combining rolls 23 to 28, inclusive, and spot-glued to the underside of the web B. The web D is drawn from its supply roll 14 through the cutting rolls 34, glue spotting roll 44 and thence through the combining rolls 24 to 28, inclusive, and spot-glued to the underside of the web C. The web D—1 is drawn from its supply roll 15 through the cutting rolls 35, glue spotting roll 45 and thence through the combining rolls 25 to 28, inclusive, where it is spot-glued to the underside of the web D. The web C—1 is drawn from its supply roll 16 through the cutting rolls 36, glue spotting roll 46 and thence through the combining rolls 26, 27 and 28 where it is spot-glued to the underside of the web D—1. The web B—1 is drawn from its supply roll 17 through the cutting rolls 37 and glue spotting roll 47 and thence through the combining rolls 27 and 28 where it is spot-glued to the underside of the web C—1. The web A—1 is drawn from its supply roll 18 through the cutting rolls 38 and the glue spotting roll 48 and thence through the pair of combining rolls 28 where it is adhesively secured to the underside of the web B—1. The eight combined webs are thence drawn as a laminated cardboard ribbon R through a series of pairs of horizontally disposed combining rolls 49 and thence through a pair of horizontally disposed cutting rolls 50 which sever the advancing ribbon crosswise into finished flat partition units which are deposited on a suitable conveyor 51 for transfer to a bundling or package station (not shown).

The cutting rolls 31 to 38, inclusive, are equipped with continuous circumferential cutters 52 that are shaped to form one or more continuous longitudinal zigzag cuts 53 in the respective webs, thereby dividing all of said webs longitudinally into two counterpart side strips and each of the webs B, B—1, C, C—1, D and D—1 into two or more counterpart intermediate strips, depending upon the width of said webs. As shown in the drawings the webs A and A—1 have single middle longitudinal zigzag cuts 53 therein which divide the web A into two side strips 1—A with serrate or saw-tooth inner edges and the web A—1 into two side strips 1—A' with corresponding serrate or saw-tooth inner edges. The webs B and B—1 have three equally spaced longitudinal zigzag cuts 53 which divide the web B into two side strips 1—B and two zigzag intermediate strips 2—B and the web B—1 into two side strips 1—B' and two zigzag intermediate strips 2—B'. The webs C and C—1 have five zigzag cuts 53 which divide the web C into side strips 1—C and four intermediate zigzag strips 2—C and the web C—1 into side strips 1—C' and four intermediate zigzag strips 2—C'. The webs D and D—1 have six zigzag cuts 53 which divide the web B into side strips 1—D and five zigzag intermediate strips 2—D and the web D—1 into side strips 1—D' and five intermediate zigzag strips 2—D'. As stated above, all of the webs have identical side strips and the zigzag intermediate strips of the webs B, B—1, C, C—1, D and D—1 are all alike but vary in number depending upon the width of the strips and the number of zigzag cuts therein.

As shown in Fig. 3, corresponding zigzag cuts 53 of the eight webs are disposed one over another, but each zigzag cut of each web is offset longitudinally with respect to the corresponding cut in the web or webs in contact therewith. By this arrangement, the saw-tooth margin on each side of each cut of each intermediate web is brought into overlapping relation to the saw-tooth margin on the opposite side of the corresponding cut in the web or webs in contact with the first mentioned web.

As shown in the drawings, the glue rolls 42 to 48, inclusive, are each provided with one or more continuous series of raised circumferentially spaced surfaces 54 that spot or print the glue in longitudinal lines 55 on the upper surfaces only of all of the advancing webs, except the web A, along certain of the longitudinal zigzag cuts 53 therein. As shown in Figs. 1 and 3, the glue lines 55 are preferably applied along the single zigzag cut 53 of the bottom web A', but not to the top web A, and along alternate zigzag cuts 53 of each of the remaining intermediate webs; and the glue lines of each intermediate web are arranged in alternate relation to the glue lines of the web or webs in contact therewith. Thus, the saw-tooth margin on each side of each alternate zigzag cut of each intermediate web is adhesively secured to the overlapping saw-tooth margin on the opposite side of the corresponding cut in the web in contact with one face of the first mentioned web and is free of the web in contact with the other face thereof, while the saw-tooth margins produced by the remaining cuts of said first mentioned web are similarly secured to the saw-tooth margins produced by the corresponding cuts in the web in contact with said other side of said first mentioned web.

After the several webs have been slit into separate strips and these strips combined into the composite ribbon R, the advancing ribbon is severed crosswise at regular intervals to form the complete flat partition units. Each of these units is preferably cut so that the saw-tooth edge or edges of each of the side and intermediate strips includes a complete or full V-shaped tongue or tab 56 at one end thereof and a half V-shaped tongue or tab 57 at the other end thereof with a complete or full V-shaped notch or reentering angle 58 between said full and half-V tongues. The full-V tongues along one of the meeting edges of adjacent strips of each web fit in the notches in the other of said meeting edges; and the full and half-V tongues on each meeting edge of adjacent strips of each intermediate web are disposed in overlapped relation to the corresponding tongues on the opposite of the corresponding meeting edges of the two adjacent strips in the web or webs in contact with said first mentioned web. The tongues of each intermediate web are glued to the overlapping tongue of an adjacent web or webs in alternate relation crosswise of the web or webs in contact therewith.

Each of the above described collapsed partition units is adapted to be opened or set up to form a twenty-four cell partition by simultaneously pulling in opposite directions on the left hand side strip of the top web A and the right hand strip of the bottom web A—I until the connected strips are brought into cell-forming relation. In the set-up position of the collapsible partition, the connected strips form three spaced parallel longitudinal partition members and five spaced parallel transverse partition members. The side strips of one of the longitudinal strips I—A and I—C' form the end sections of one of the outermost longitudinal partition members and the intermediate zigzag strips 2—B, 2—C, 2—D and 2—D' form the intermediate sections of said partition member. The other outermost longitudinal partition is made up of the side strips I—C and I—A' and the intermediate zigzag strips 2—D, 2—D', 2—C' and 2—B'. The intermediate longitudinal partition member is made up of the side strips I—B and I—B' and the four zigzag intermediate strips 2—C, 2—D, 2—D' and 2—C'. The outermost transverse partition located nearest the corresponding ends I—A, I—B and I—C of the longitudinal partition member is made up of the side strips I—A and I—D and the two intermediate zigzag strips 2—B and 2—C. The other outermost transverse partition member is made up of the side strips I—D' and I—A', the two zigzag intermediate strips 2—C' and 2—B'. The middle transverse partition member is made up of the side strips I—C and I—C' and the two zigzag intermediate strips 2—D and 2—D'. The transverse partition member between the first mentioned outermost transverse partition member and the middle transverse partition member is made up of the two side sections I—B and I—D' and the two intermediate zigzag strips 2—C and 2—D; and the remaining transverse partition member is made up of the two side strips I—D and I—B' and the two zigzag intermediate strips 2—D' and 2—C'.

Thus, each of the longitudinal partition members is made up of two side strips and four intermediate zigzag strips; and each of the transverse partitions is made up of two side strips and two intermediate zigzag strips. The full V-shaped tongues 56 of adjacent strips of each partition member are overlapped flatwise and adhesively secured together and the half-V tongues 57 of said adjacent strips are similarly overlapped and secured together. When the connected strips are moved into partition forming relation, the tongues of each strip of each web vacate or swing out of the notches of an adjacent strip of said web, thereby producing substantially diamond-shaped horizontal openings 59 through each partition member between the overlapped full and half-V tongues 56 and 57 of adjacent strips thereof and V-shaped notches 60 in the top and bottom edges of said partition member between the converging outer edges of the overlapped full-V tongues of said adjacent sections of said partition member. The overlapping full-V tongues 56 of each two adjacent strips of each partition member extend through the diamond-shaped openings 59 formed by the opposing V-notches 60 of the adjacent strips of the partition member that is disposed at right angles to said first mentioned partition member; and the overlapped half-V tongues 57 of adjacent sections of said first mentioned partition member extend through the V-shaped notches 60 formed by the inclined outer edges of the full-V tongues of said first mentioned partition member. When the partition is opened or set up with the longitudinal and transverse partitions at right angles to one another, the overlapped full-V and half-V tongues of adjacent strips of each partition member bind against the sides of the quadrilateral diamond-shaped openings and V-shaped notches through which they extend and thus resist movement of the partition members beyond a position at right angles to one another. The V-shaped notches and diamond-shaped openings in the partition members also provide for horizontal ventilation through the erected or set-up partition.

The hereinbefore described collapsible cellular partition has several important advantages. It is simple and inexpensive and may be shipped and stored in completely assembled collapsed compact form and may be readily erected merely by pulling endwise in opposite directions on the top and bottom webs or merely by lifting or raising with one hand one strip of the top web so that the strips fall automatically into cell-forming relation. The overlapped full-V and half-V tongues of each partition member extend through the diamond-shaped openings and V-shaped notches of the partition members disposed at right angles thereto; and the shape of said tongues, openings and notches prevent relative movement of the intersecting partition in the planes thereof, while the edges of the cooperating tongues and openings or notches bind one on another and resist movement of the longitudinal and transverse partition members beyond an angle of ninety degrees. The tongue receiving openings and notches also provide for horizontal ventilation through the set-up partition. None of the elements that make up the partition is scored or bent to permit unfolding or collapse of the partition. The partition is made up of a relatively large number of separate strips, but these strips are quickly cut, united and severed into individual partitions by a continuous process which is simple and economical and overcomes any objection to the number of separate strips employed in the finished partition.

While we have shown and described a twenty-four cell partition, the partition may be made with different numbers of cells. For instance, Fig. 15 illustrates a simple four cell partition made from two webs like the top and bottom webs A and A—I of the twenty-four bottle partition. In this smaller partition, the two webs are each provided with a single longitudinal zigzag cut 53, the cuts are longitudinally offset to bring the tongues of one web into overlapped relation to the tongues of the other web and the overlapped tongues are secured together and the two webs combined into a two ply ribbon which is severed transversely to form the collapsed partition. When opened, this partition comprises two right angularly disposed partition members, each comprising one of the strips of the web A and one of the strips of the web A—I.

Obviously, the hereinbefore described partition admits of considerable modification without departing from the invention. Therefore, we do not wish to be limited to the precise construction and process shown and described.

What we claim is:

1. The process of manufacturing collapsed partition units of the kind described which consists in dividing each of two webs by a longitudinal zigzag cut into separate strips having interfitting alternating tongues and notches along their meeting edges, superimposing said webs flatwise one on the other with the tongues of each strip on each side of the cut in each web overlapping the tongues of the strip on the other side of the cut in the other web and with the notches of each strip on each side of the cut in each web opening into the notches of the strip on the other side of the cut in the other web, permanently securing said overlapping tongues together, and then dividing the consolidated webs crosswise into complete collapsed partition units.

2. The process of manufacturing collapsed partition units of the kind described which consists in dividing each of two webs by a longitudinal zigzag cut into separate strips having interfitting alternating substantially V-shaped tongues and notches along their meeting edges, superimposing said webs flatwise one on the other with the tongues of each strip on each side of the cut in each web overlapping the tongues of the strip on the other side of the cut in the other web and with the notches of each strip on each side of the cut in each web opening into the notches of the strip on the other side of the cut in the other web, permanently securing said overlapping tongues together, and then dividing the combined webs crosswise into complete collapsed partition units, each of the four strips of which includes a substantially complete notch and a substantially complete tongue.

3. The continuous process of manufacturing collapsed partition units of the kind described which consists in drawing two webs from separate supply rolls, dividing each of said webs by a longitudinal zigzag cut into separate strips having interfitting alternating tongues and notches along their meeting edges applying an adhesive to one face of one web along the tongues of the two strips thereof, running said webs together into contact flatwise with the face of the web having the adhesive thereon in contact with the other web and with the tongues of each strip on each side of the cut in each web overlapping the tongues of the strip on the other side of the cut in the other web and with the notches of each strip on each side of the cut in each web opening into the notches of the strip on the other side of the cut in the other web, and then dividing the adhesively united webs crosswise into completely assembled collapsed partition units.

4. The continuous process of manufacturing collapsed partition units of the kind described which consists in continuously drawing two webs from separate supply rolls, dividing each of said webs by a longitudinal zigzag cut into separate strips having interfitting alternating V-shaped tongues and notches along their meeting edges, applying an adhesive to one face of one web along the tongues of the two strips thereof, running said webs together into contact flatwise with the face of the web having the adhesive thereon in contact with the other web and with the tongues of each strip on each side of the cut in each web overlapping the tongues of the strip on the other side of the cut in the other web and with the notches of each strip on each side of the cut in each web opening into the notches of the strip on the other side of the cut in the other web, and then dividing the combined webs crosswise into complete collapsed partition units, each of the four strips of which includes a substantially complete notch and a substantially complete tongue.

5. The continuous process of manufacturing collapsed partition units of the kind described which consists in drawing two webs from separate supply rolls, dividing each of said webs by a longitudinal zigzag cut into separate strips having interfitting alternating tongues and notches along their meeting edges, applying spots of adhesive to the tongues of both strips of one of said webs on one face thereof, running said webs together into contact flatwise with the face of the web having the spots of adhesive thereon in contact with the other web and with the tongues of each strip on each side of the cut in each web overlapping the tongues of the strip on the other side of the cut in the other web and with the notches of each strip on each side of the cut in each web opening into the notches of the strips on the other side of the cut in the other web, and then dividing the adhesively combined webs crosswise into completely assembled collapsed partition units.

6. The continuous process of manufacturing collapsed cellular partitions of the kind comprising top and bottom webs and at least two intermediate webs which consists in drawing said webs from separate supply rolls, dividing each of said top and bottom webs by a longitudinal zigzag cut into two strips having interfitting alternating tongues and notches along their meeting edges, dividing each of said intermediate webs by similar longitudinal zigzag cuts into four or more strips having interfitting tongues and notches along their meeting edges, applying adhesive to the upper surface of the bottom web along the tongues on each side of the cut therein and to the upper surfaces of the intermediate webs along the tongues on each side of alternate cuts therein, running said webs together in superimposed relation with a cut in each web in vertical alinement with a cut in the web in contact therewith and with the tongues on each side of the cut in each web overlapping the tongues of the strips on the other side of the cut in the web or webs in contact therewith and with the notches of each strip on each side of the cut in each web opening into the notches of the strips on the other side of the cut in the web or webs in contact therewith, and then dividing the adhesively combined webs crosswise into complete collapsed partition units, each strip of which includes a substantially complete notch and a substantially complete tongue.

WALTER C. GEORGE.
ARTHUR P. KLASING.

REFERENCES CITED

The following references are of record in the file of this patent:

UNITED STATES PATENTS

| Number | Name | Date |
| --- | --- | --- |
| 1,023,989 | Brown | Apr. 23, 1912 |
| 1,097,840 | Bodge | May 26, 1914 |

Certificate of Correction

January 10, 1950

Patent No. 2,494,437

WALTER C. GEORGE ET AL.

It is hereby certified that error appears in the printed specification of the above numbered patent requiring correction as follows:

Column 4, line 7, for "web B" read *web D*;

and that the said Letters Patent should be read with this correction therein that the same may conform to the record of the case in the Patent Office.

Signed and sealed this 16th day of May, A. D. 1950.

[SEAL]

THOMAS F. MURPHY,
*Assistant Commissioner of Patents.*